Figure 1:
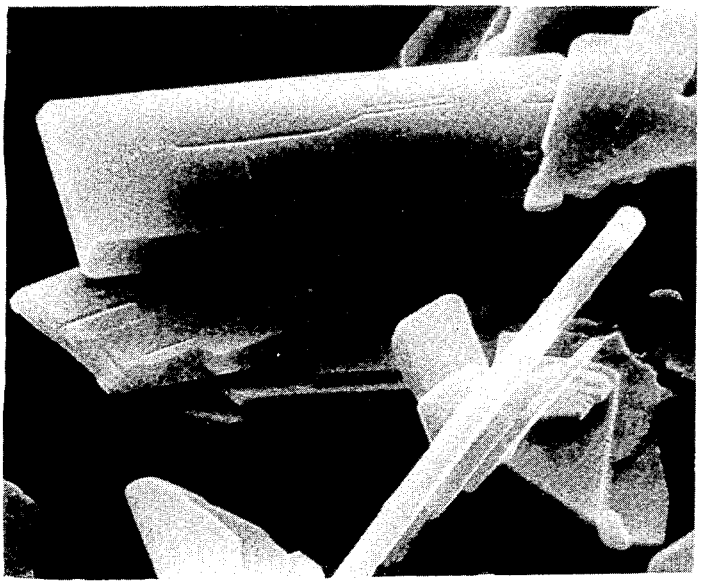

United States Patent [19]
Clark

[11] 3,833,394
[45] Sept. 3, 1974

[54] ZINC SULPHIDE PIGMENTS

[75] Inventor: David William Harold Clark, Leigh-on-Sea, England

[73] Assignee: May & Baker Limited, Dagenham, Essex, England

[22] Filed: Apr. 24, 1972

[21] Appl. No.: 246,762

[30] Foreign Application Priority Data
Apr. 28, 1971 Great Britain..................... 11907/71

[52] U.S. Cl............................... 106/293, 106/193 J
[51] Int. Cl................................................ C09c 1/04
[58] Field of Search..................................... 106/293

[56] References Cited
UNITED STATES PATENTS
2,187,130  1/1940  Lightbody........................... 106/293
3,443,888  5/1969  Calbeck............................. 106/293
3,661,609  5/1972  Kaufman............................ 106/293

Primary Examiner—Curtis R. Davis
Attorney, Agent, or Firm—Stevens, Davis, Miller & Mosher

[57] ABSTRACT

A process for increasing the refractive index of planar particles of a zinc orthophosphate is provided which comprises depositing on the particles zinc sulphide formed in situ by heating an aqueous solution of a water-soluble zinc salt and a water-soluble thiosulphate. The resulting pigments have an enhanced pearly or sparkly appearance.

25 Claims, 5 Drawing Figures

ZINC SULPHIDE PIGMENTS

This invention relates to pigments of a nacreous character and to their production.

One of the most satisfactory nacreous pigments (or pearling agents) is natural pearl essence, the naturally occurring form of guanine which can be obtained from fish scales. Unfortunately, however, this substance is difficult to isolate and thus very costly. Artificial nacreous pigments have in general suffered from one or other of the defects of being insufficiently pearlescent or too toxic for general use. Ideally, a nacreous pigment should not only be inherently pearlescent but, in addition, have a high refractive index, good stability to light and heat, chemical unreactivity, and lack of toxicity. Because of their high refractive index, compounds of bismuth and lead such as bismuth oxychloride and lead subcarbonate have been used on a very large scale as pearling agents but they do not satisfactorily fulfill all the above criteria. Thus, the bismuth compounds discolour on exposure to light, those of lead are toxic, and both are prone to sulphur staining. Consequently, there is a need for pearling agents which can be produced in a relatively simple manner and which do not suffer from these defects.

Various other materials exhibit pearlescence but are of very little practical value as pearling agents since they have a relatively low refractive index and hence a poor "covering power." Examples of these include the plate-like materials of zinc orthophosphate. The object of the present invention is to provide a process whereby such plate-like materials can be rendered more suitable for use as pearling agents and pigments by increasing their refractive index. It has been found, according to the present invention, that this can be achieved by coating such plate-like materials with a layer of zinc sulphide formed in situ from a solution of a zinc salt and a thiosulphate. Accordingly, the present invention provides a process for increasing the refractive index of planar particles of a zinc orthophosphate of formula: $Zn_3(PO_4)_2 \cdot x\ H_2O$ in which $x$ has a value from 0 to 8, which comprises depositing thereon zinc sulphide formed in situ by heating an aqueous solution of a water-soluble zinc salt and a water-soluble thiosulphate at a temperature of at least 65°C and at a pH above 3. Both white and coloured pigments can be obtained by this process. The refractive index of the template should be at least 0.05 lower than that of the sulphide layer deposited and preferably from 0.2 to 0.5 lower.

It is to be appreciated that if a satisfactory product is to be obtained, the initial "template" must be prepared under carefully controlled conditions so that it has the correct planar structure and the right order of thickness. For the pearling agents, the size of the crystals should generally be from 1 to 100 microns across, suitably from 5 to 50 or 75 microns across, especially from 10 to 40 microns across. If materials having a sparkling decorative appearance are required as opposed to materials for strictly nacreous finishes, then larger particle sizes of the order of up to 1 to 2 mm. in diameter are desirable. The particles should generally have a thickness from 30 to 750 millimicrons, especially about 100 millimicrons. Also the length/thickness ratio is of importance; in general this ratio should be from 6:1 to 2,500:1, for example from 6.7:1 to 2,500:1, especially from 100:1 to 400:1.

As stated above, the plate-like materials which form the substrate or "template" in the process of the present invention are pearly zinc orthophosphates of formula: $Zn_3(PO_4)_2 \cdot x\ H_2O$ in which $x$ has a value from 0 to 8; the preferred substrate is the hydrate corresponding to the formula: $Zn_3(PO_4)_2 \cdot 4H_2O$. The preferred zinc orthophosphate can be obtained by mixing a solution of a zinc salt with a hot, suitably about 85° to 97°C., solution of a water-soluble (generally containing from 0.5 to 2 percent and preferably about 0.9 percent w/v as $PO_4 \equiv$) phosphate e.g. an alkali metal or ammonium phosphate optionally containing an anionic surface-active agent to modify the crystal size and shape, and then cooling. Preferably the temperature of the solution is raised to boiling point after mixing and before cooling.

Figure 4:

The ways in which the particle parameters can be varied will now be discussed with reference to the preferred template which is hydrated zinc orthophosphate $[Zn_3(PO_4)_2 4H_2O]$. It is to be appreciated, however, that the general principles can be applied to the other zinc orthophosphates which may be used in the process of the present invention. Pearly planar crystals of the zinc orthophosphate can best be obtained from a solution of disodium hydrogen phosphate and zinc sulphate. If, as is the case, it is desired to prepare crystals having a uniform size, then it is best to add "seed" crystals of zinc orthophosphate since without such seeds the sizes of the crystals obtained will vary considerably. Under normal conditions of recovery of the crystals involving removal of water from the resulting aqueous suspension, the crystals obtained will be of the order of 1 micron in thickness. FIG. 1 of the accompanying drawings which is a photomicrograph (magnification X6450) shows typical platelets of pearly zinc orthophosphate obtained by this procedure. The rectangular platelets have the approximate dimensions, $30\mu \times 8\mu \times 1\mu$ thick. In fact, calculations suggest that the optimum thickness for maximum reflection of light for zinc orthophosphate, of refractive index 1.62, is about 90 m$\mu$. If thinner crystals are required for the purposes of obtaining true pearling agents, then this may be achieved by adding an anionic surface active agent to the reaction mixture. It has been found that cationic surface active agents generally have little effect on the resulting particle size and thickness but anionic surface active agents, in particular those sold under the trade marks "Manoxol O.T." [sodium bis(2-ethyl hexyl) sulphosuccinate] and "Nansa "HS" [sodium dodecyl benzene sulphonate] have an appreciable effect. The presence of Manoxol O.T., for instance, causes a change in the crystal structure giving rise to thin hexagonal plates and not the more usual oblong plates. Here, an amount of surface active agent of the order of 0.15 percent is sufficient to reduce the thickness of the crystals quite considerably, and, as a result, the product is considerably more silvery and pearly. FIG. 4 of the accompanying drawings is a photomicrograph (magnification X2500) illustrating an example of zinc orthophosphate prepared in the presence of 0.05 percent Manoxol O.T. If such a surface active agent is present, then it has been found that it is generally unnecessary to "seed" the crystals with preformed zinc orthophosphate. If the product is prepared in the presence of an anionic surface active agent and separated and washed with water, the product tends to aggregate when placed in the zinc sulphate coating solution. Aggregation does not, however, occur if the product is prepared in the presence of an anionic surface active agent, separated from the reaction mixture, washed with an aqueous solution of the anionic surface active agent and stored as a dispersion in a solution of the anionic surface active agent containing a concentration of the surface active agent at least as high as that present during the preparation of the product. The dispersion of the "template" containing an anionic surface active agent can be used as such for the subsequent coating operation. In other words, it is unnecessary to remove the surface active agent prior to coating the "template" with zinc sulphide. However, it has been found that "template" which has become aggregated in the coating solution may be satisfactorily coated with zinc sulphide to give a pigment which is readily dispersible.

Having prepared the template or substrate in the desired form, it is then necessary to deposit the layer of zinc sulphide on it. As mentioned above, this involves suspending the template, generally in an aqueous medium, and adding a mixture of a water-soluble zinc salt and a water-soluble thiosulphate thereto. The preferred zinc salt is zinc sulphate but other salts such as the chloride, nitrate, acetate and formate can also be used. The preferred thiosulphate is sodium thiosulphate but other thiosulphates such as the potassium and ammonium salts can also be used.

At room temperature, zinc salt and thiosulphate react only very slowly, but when they are heated to a temperature of at least about 65° C. they react readily to form zinc sulphide together with some sulphur. The reaction has been reported to proceed in accordance with the equation:

$$4Na_2S_2O_3 + ZnSO_4 \rightarrow 4Na_2SO_4 + ZnS + S.$$

In addition, traces of hydrogen sulphide and sulphur dioxide are believed to be formed by secondary reactions. From this reaction scheme one would expect to use about 4 mols of thiosulphate per mol of zinc salt; in general, from about 1 to 6 mols of thiosulphate may be used per mol of zinc salt. In fact it would appear as though less thiosulphate than suggested by the above equation is required and it is thought that a more accurate representation of what takes place is as follows:

$$ZnSO_4 + 2Na_2S_2O_3 \rightarrow ZnS_2O_3 + 2Na_2SO_4$$

$$2ZnS_2O_3 \xrightarrow{heat} ZnS + ZnS_3O_6$$

$$Na_2S_2O_3 + H_2SO_4 \rightarrow Na_2SO_4 + S + SO_2 + H_2O$$

Investigation has shown that, in fact, equally good results can be obtained when using a molar ratio of thiosulphate/zinc salt of only 2:1. The concentration of zinc salt and thiosulphate is not particularly critical, but, of course, they must be present in an amount such that they are wholly dissolved in the aqueous medium. It is generally desirable to use an excess of the zinc salt and thiosulphate in order to speed up the reaction. The time taken for a satisfactorily coated pigment to be obtained is, in fact, largely dependent on the concentration of the template suspended in the aqueous medium and the reaction temperature and the concentration of the zinc salt and thiosulphate. If only a low concentration of the template is employed, there is much less likelihood of the zinc sulphide, which is formed, being deposited on the template crystals rather than on, for example, the walls of the vessel in which the reaction is carried out. Generally, the concentration of template in the suspension should be at least 2 grams per litre. By increasing the concentration, the time taken is, naturally, increased. Generally, amounts up to 100 grams of template per litre of water may be used.

As mentioned above, the effective lower temperature limit at which the deposition should be carried out is 65° C. At the boiling point of the solution, a surface scum of yellow sulphur separates from the reaction mixture, but at lower temperatures this is not noticeable. The ratio of zinc sulphide to sulphur produced varies to some extent at different temperatures and the nature of the sulphur produced may change with increasing temperature. Generally the preferred temperature range is from 65° to 78° C. At higher temperatures the proportion of material deposited as zinc sulphide falls off quite markedly.

The pH of the reaction mixture is generally not critical and it is normally unnecessary to lower the pH by the addition of acid. The pH will be above 3, preferably from 4 to 6 or 6.5. The ordinary laboratory mixture of zinc sulphate and sodium thiosulphate has a pH of about 4.5 and this can generally be used without change. A pH value of 4.2 to 4.5 is generally preferred and it is unnecessary to add acid to the reaction mixture. It has, in fact, been discovered that the purity of the zinc sulphide deposited is greatly influenced by the pH of the medium. At a reaction temperature of 78° C., maximum purity is achieved at pHs between 4 and 4.5. The purity gradually decreases as the pH is raised. Below pH 4, however, the purity is very considerably reduced.

The duration of the reaction depends on the amount of zinc sulphide it is desired to deposit, and this, in turn, is dependent upon the temperature at which the deposition process is carried out. As a general guide when using 100 g. of zinc sulphate 0.7H$_2$O, 330 g. of sodium thiosulphate 0.5H$_2$O in 1 litre of water, the reaction should be continued for at least 2 hours if the deposition is carried out at 80° C. whereas if the deposition is carried out at 90° to 95° C. the minimum time can generally be reduced to about 1½ hours. However, as mentioned above, lower temperatures are preferred since purer products result. In practice, it is useful to carry out a trial run, and to examine the time taken for a faint interference colour to appear in the solution. Then, if a white pearling agent is desired, the reaction should be repeated reducing the time by, for example, about 1 hour when the reaction is carried out at about 65° C. Of course if coloured pearling agents are desired then the time may be estimated in a similar manner, stopping the reaction when the desired colour has been obtained.

It has been found that if the template is obtained using an anionic surface-active agent it is desirable that the deposition process also be carried out in the presence of such a surface-active agent. Indeed, the presence of an anionic surface-active agent is generally desirable during the deposition process. Examples of anionic surface-active agents which may be used are Manoxol O.T., Manoxol N (sodium dinonyl sulphosuccinate), Nansa HS (sodium dodecyl benzene sulphonate) and Pentrone T powder (Glovers Chemicals Ltd.). It will be appreciated that the optimum amounts and nature of the surface-active agent will depend on the particular template under consideration; one skilled in the art will realise that these factors can readily be ascertained by routine experiment. In general, increasing amounts of surface-active agent decrease the particle size and increase the lustre and dispersion of the product. However if too much surface-active agent is present, this prevents the deposition on the substrate. At least 0.02 percent by weight should generally be present in the solution. Also if the product is obtained using a surface-active agent it is preferable to carry out subsequent washing operations, and to keep the product in the presence of the same surface-active agent to avoid aggregation.

It has been found that the purity of the coated product can be improved by bubbling an inert gas through the solution during the deposition. The purpose of this is to remove the hydrogen sulphide and sulphur dioxide formed from the template zone. If they are not swept away there is a tendency for them to combine to form sulphur which can then deposit on the template.

In a typical embodiment, pearly zinc orthophosphate crystals prepared as discussed above are added at a concentration of, for example, about 4 or 5 percent to a litre of water containing about 10 percent by weight of hydrated zinc sulphate and 33 percent by weight of hydrated sodium thiosulphate. The suspension is stirred gently and then the temperature of the suspension raised rapidly to the desired temperature and maintained at this temperature for the desired period of time. The product should then be separated from the aqueous solution, for example by spinning it in a cloth bag or by filtration, suitably when the medium is still hot. The product may then be resuspended in water containing a small amount of a surface-active agent in order to aid subsequent dispersion of the pigment. The product is then again separated from the water and dried; a temperature of about 120° C. is suitable.

Figure 2:
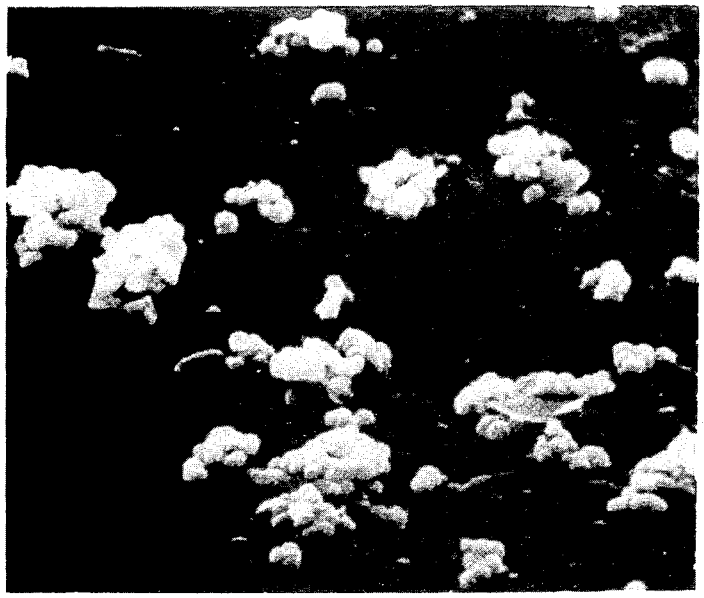
Figure 3:
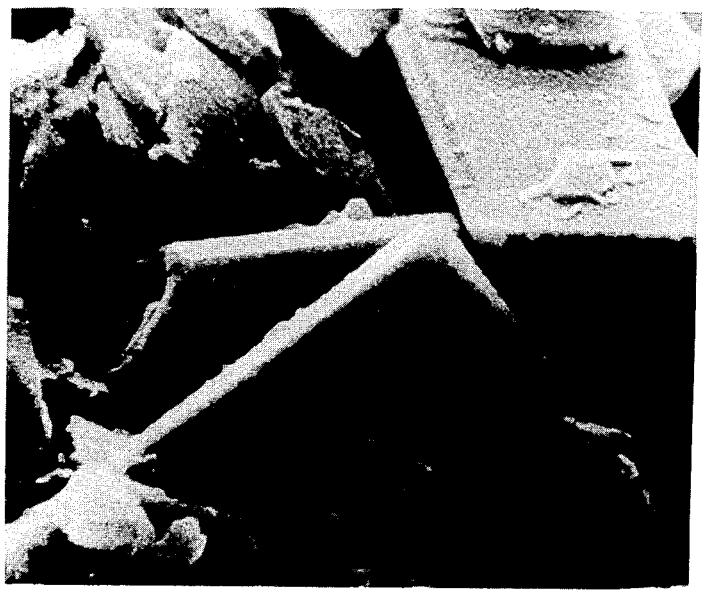
Figure 5:
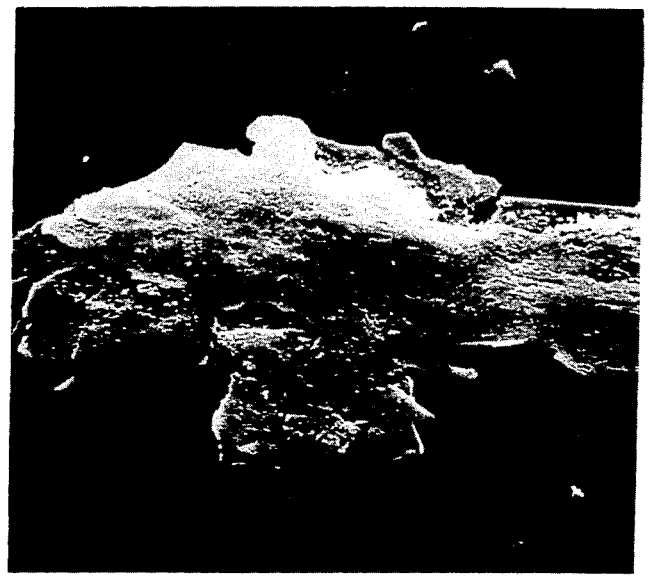

The exact nature of the resulting nacreous pigment is not known with certainty, but it is believed to consist of a substantially unaffected substrate with a layer of zinc sulphide thereon. In addition, however, the layer will contain some free sulphur and it is likely that a few sulphide ions will penetrate the substrate and react with it if they are capable of doing so. FIGS. 2 and 3 of the accompanying drawings, which are photomicrographs (magnification X12900 and X6400, respectively), show the type of particles of zinc sulphide which are produced by the thiosulphate reaction in the absence of a template and the zinc sulphide particles which have been deposited on zinc orthophosphate crystals, respectively. FIG. 5 (magnification X2500) shows the particles of FIG. 4 which have been sulphided.

As previously mentioned, the thiosulphate reaction also gives rise to trace amounts of hydrogen sulphide, and this hydrogen sulphide will generally be able to attack the substrate crystal with the result that the crystal also contains trace amounts of zinc sulphide.

When several deposition reactions have been carried out in a glass vessel, it has been found that a thin, clear, iridescent film of zinc sulphide adheres to the inner surface of the vessel. This film can be removed by shaking the vessel violently with a little water, giving rise to flakes in the form of thin plates. These plates display pronounced pearly qualities and are thought to be representative of the material deposited on the substrate crystals. It has been found that the refractive index of these particles is between about 1.82 and 1.90. Consequently, it is thought that the refractive index of the surface layers of zinc sulphide on the substrate are of the same order. It will be noted that pure crystallised zinc sulphide has a refractive index of about 2.3; the lower refractive index of the zinc sulphide flakes is due to the fact that these flakes are amorphous in character since the thiosulphate reaction involves the production of colloidal zinc sulphide particles.

The colours observed at normal incidence in reflection on a film are determined partially by reinforcement of light of wavelengths $4nd/2N-1$, but mainly by destructive interference of light of wavelength $2nd/N$, where N is a positive integer, $n$ is the refractive index of a layer and $d$ is its thickness; $n \cdot d =$ optical thickness. The resulting variation of colour with increasing film thickness is given by Newton's scale of colours. In effect, by altering the thickness of the sulphide layer, one alters the optical properties of the resulting pigment. When the optical thickness of the sulphide layers reaches a quarter wavelength dimension for a particular wavelength of visible light, the pigment will become coloured. Where particularly strong colours are required, it is important to maintain a central substrate portion which, in itself, has a suitable optical thickness to reinforce the reflection from the two adjoining sulphide layers, i.e., the layers should have the same optical thickness. Table I below gives suitable thicknesses for crystals of refractive index 1.62 with sulphide layers of average refractive index 1.9.

From this Table, it can be seen what order of thicknesses are desired if particular colour effects are to be obtained.

If desired, the resulting pigments may subsequently be heated to temperatures of about 350° C. By so doing, the remaining traces of water are removed, and there may also be a rise in the refractive index of the surface layers. Unfortunately heating to these temperatures sometimes results in some loss of mechanical strength. However, by heating further up to temperatures of at least about 750° C. which may be carried out in the absence of oxygen, e.g. in an atmosphere of nitrogen to preserve the zinc sulphide coating, the mechanical strength of the crystal may actually be increased and there is again an increase in refractive index. At temperatures of about 600° C. and above in the presence of oxygen some of the zinc sulphide present as a coating on the template is converted to zinc oxide by oxidation so that the final product contains at least some oxide ions in place of part or all of the sulphide ions.

The pearling agents and decorative products of the present invention can be used in a variety of ways to produce products having a pearly and/or decorative effect. Thus the pigments of the present invention can be incorporated into plastics and cosmetic nail varnish preparations as well as the other substrates in which known pearling agents can be used. In particular, a pearly or nacreous effect is produced when the pigments of the present invention are compounded and cast into a polyvinyl chloride resin, an acrylic resin, a polyester resin or into lacquer films of cellulose nitrate or acetate as well as polyolefines and polystyrene resin.

TABLE I

| Wavelength of light mμ | Constructive interference ||||| Destructive interference |||||
|---|---|---|---|---|---|---|---|---|---|---|
| | Colour observed by || thickness of centre layer of crystal mμ | thickness of sulphide layer mμ | thickness of crystal for optimum reinforcement mμ | Colour observed by || thickness of centre layer of crystal mμ | thickness of sulphide layer mμ | thickness of crystal for optimum reinforcement mμ |
| | reflection | transmission | | | | reflection | transmission | | | |
| U.V. up to ca 380 | white | white | 58 | 50 | 158 | white | white | 117 | 100 | 317 |
| 450 | blue | yellow | 69 | 59 | 187 | yellow | blue | 139 | 118 | 375 |
| 510 | green | red | 79 | 67 | 213 | red | green | 157 | 134 | 425 |
| 550 | yellow | blue | 85 | 72 | 230 | blue | yellow | 170 | 145 | 460 |
| 640 | red | green | 99 | 84 | 267 | green | red | 197 | 169 | 535 |

The following Examples further illustrate the present invention. Examples 1 to 3 illustrate the preparation of the substrate material while Examples 4 to 6 and 8 to 10 illustrate the deposition process of the present invention with Example 7 illustrating the subsequent optional calcination.

EXAMPLE 1

Preparation of pearly zinc orthophosphate [$Zn_3(PO_4)_2 \cdot 4H_2O$] by seeding.

Zinc orthophosphate (600 g) was mixed with a small quantity of water and micronised using a "Silverson" macerator. These seed crystals were added to a solution of disodium hydrogen phosphate $0.12H_2O$ (8kg) in water (120 l) This solution was heated to 85° C. and added over a period of 5 minutes to a solution of zinc sulphate $0.7H_2O$ (6kg) in water (120 l) at 85° C. with constant stirring. The precipitated zinc orthophosphate was allowed to settle and most of the supernatant liquid removed by decanting. Some of the residual water was removed from the precipitate by spinning in a cloth bag. 4.8 kg of pearly zinc orthophosphate was obtained and stored as a damp paste. The product obtained (see FIG. 1) was in the form of rectangular platelets measuring approximately $30\mu \times 8\mu \times 1\mu$ thick.

EXAMPLE 2

Preparation of pearly zinc orthophosphate involving the use of a surface active agent.

A first solution (solution A) was obtained by dissolving disodium hydrogen phosphate $0.12H_2O$ (48 g) and Manoxol O.T. (1.5g) in 1 litre of water. A second solution (solution B) was obtained by dissolving zinc sulphate $0.7H_2O$ (48 g) and Manoxol O.T. (1.5 g) in 1 litre of water. Both solutions were heated separately to 85° C. and then solution A was poured rapidly into solution B with stirring. The white suspension obtained was stirred gently and maintained at 85° C. for 1 hour. The resulting silvery suspension was cooled to room temperature and the product separated by centrifuging at 1,500 r.p.m. The product was washed thoroughly with 0.15 percent w/v Manoxol O.T. solution by centrifuging and discarding the wash liquors.

The thickness of the crystals obtained in this Example was considerably less than that obtained in Example 1. Furthermore, the crystals were considerably more silvery and pearly than those of Example 1. It was found, however, that the product of this Example was only stable as a dispersion in the presence of Manoxol O.T. in the concentration of at least 0.15 percent w/v. When washed with water the material aggregated badly.

EXAMPLE 3

Preparation of Pearly Zinc orthophosphate [$Zn_3(PO_4)_2 \cdot 4H_2O$] in the presence of an Anionic Surface Active Agent.

The following solutions were prepared:

Solution A — Disodium hydrogen phosphate ($Na_2HPO_4 \cdot 12H_2O$) (96g = 0.268M) and Manoxol OT (sodium di(2-ethylhexyl)sulphosuccinate) (3.0 g) were dissolved in tap water (2 litres) at 85° C.

Solution B —Zinc sulphate $ZnSO_4 \cdot 7H_2O$ (96g = 0.33M) and Manoxol OT (3.0 G) were dissolved in tap water (2 litres) at 85° C.

Solutions A and B (each containing 0.15 percent w/v of Manoxol OT) were prepared separately in glass beakers and solution B added rapidly to A with good stirring, the temperature of both solutions being kept at 85° C for the addition. The white suspension was brought just to boiling point (avoiding foaming) and the reaction allowed to cool in air with continuous gentle stirring. After 3½ hours the temperature of the reaction mixture had dropped to 30° C and the product was silvery and very pearly in appearance. The product was separated by centrifuging at 1,500–1,800 r.p.m. The residual solid was washed four times with an 0.1 percent w/v solution of Manoxol OT by stirring, centrifuging and decanting the liquid phase. The product was stored as a damp paste.

Yield: 80 g paste assayed at 31 percent solids – 25 g dry pigment = 49 percent theory based on Zn used.

Note (i) The white precipitates formed between tap water and the reactants prior to mixing the two solutions should not be filtered from the solutions as these act to seed the reaction. If the tap water is dirty it should be filtered before preparation of the solution. Particles of foreign matter can be removed from the zinc sulphate and sodium phosphate by making saturated solutions of these substances and filtering them before adding the requisite quantity to the main bulk of filtered water.

Note (ii) The product should be washed, in this instance, only with Manoxol OT solution as it aggregates badly when washed with plain water. The product should also be stored as a damp paste wet with Manoxol OT solution.

Note (iii) In common with many other pearling agents the product from this reaction can be difficult to filter. Centrifuging at the given speed is, however, a satisfactory means of separation.

Note (iv) Various Mannoxol content concentrations from 0.025 to 0.25 percent w/v have been used for this reaction. The particle size of the product decreases with an increase in the Manoxol concentration within this range whereas the dispersion and lustre is increased by an increase in Manoxol concentration within this range.

EXAMPLE 4

Zinc sulphate $0.7H_2O$ (100 g) and sodium thiosulphate $0.5H_2O$ crystals (330 g) were dissolved in water (1 litre). Pearly zinc orthophosphate obtained as in Example 1 (60 g of paste equivalent to 40 g dried material) was added and the suspension stirred gently. The temperature of the reaction was raised rapidly to 80° C. and maintained at this temperature for 2 to 2¼ hours. The product was filtered hot and washed well with water. The product was then resuspended in water (200 ml) and "Arquad 2HT" (0.01g; a cationic surface active agent — a dialkyl [24 percent hexadecyl, 75 percent octadecyl, 1 percent octadecenyl] dimethyl ammonium chloride) was added and the suspension stirred for 15 minutes. The product was filtered off, washed well with water and dried at 122° C. for 8 hours. About 40 g of product was obtained exhibiting a silvery lustre when incorporated into a cellulose nitrate lacquer.

EXAMPLE 5

Zinc sulphate $0.7H_2O$ (10 g) and sodium thiosulphate $0.5H_2O$ (33 g) were dissolved in water (100 ml). Pearly zinc orthophosphate obtained as in Example 2 (7.5 g of paste in 0.15 percent w/v Manoxol O.T. solution equivalent to 2.5 g dried material) was suspended in an aqueous solution of Manoxol O.T. (0.15 percent w/v; 50 ml) and added to the zinc salt solution. The suspension obtained was stirred gently. The temperature of the reaction was raised rapidly to 78° C. and maintained at this temperature for 4 hours. The product obtained was separated by centrifuging at 1,500 r.p.m., washed thoroughly with 0.1 percent w/v aqueous Manoxol O.T. solution by centrifuging and discarding the washing liquors, and dehydrated by washing twice with ethanol. The ethanolic paste obtained exhibited a pearly effect when incorporated into a cellulose nitrate lacquer film.

EXAMPLE 6

Example 4 was repeated except that the reaction temperature was 78° C. and the duration of the reaction was increased to 3 hours. The resulting product displayed a gold interference colour.

EXAMPLE 7

Calcination of pearly zinc orthophosphate coated with zinc sulphide.

A sample of the product obtained as in Example 4 was heated in an electric furnace in a nitrogen atmosphere. The temperature was raised gradually from room temperature at a rate of 1° C./20 seconds to a maximum temperature of 600° C. (about 3¼ hours heating). When this point had been reached the oven was switched off, and the apparatus allowed to cool, while maintaining a gentle flow of nitrogen through the apparatus.

The product showed increased lustre and greater mechanical strength when compared with the starting material.

EXAMPLE 8

The product obtained in Example 3 (80 g paste) was suspended in 0.1 percent w/v Manoxol OT solution (130 ml) and this suspension added to a solution of zinc sulphate heptahydrate (90g = 0.314 M) and sodium thiosulphate pentahydrate (300g = 1.22M) in distilled water (700 ml). The pH of this solution should preferably be in the range 4.2–4.5 and could be adjusted by the addition of dilute NaOH or $H_2SO_4$. The mixture was stirred gently and the reaction heated rapidly to 78° C and maintained at this temperature for 5½ hours. Then the reaction mixture was cooled to 50° and the product separated by centrifuging at 1,500–1,800 r.p.m., washing the residue four times with water, twice with ethyl alcohol and twice with n-butyl alcohol. The product was stored as a paste in n-butyl alcohol. Yield: 112.5 g paste = 22.6 percent solids = 25.4g of dry pigment. The product was a white paste exhibiting a silvery lustre when incorporated into a lacquer or plastic material.

Note (i) The quantity of sodium thiosulphate in the reaction may be halved with no apparent deterioration of results.

Note (ii) The time/temperature relationship is quite critical and it is recommended that care be taken to ensure that the temperature is maintained at a value better than ± 1° C during the reaction.

Note (iii) The duration of the reaction depends on the surface area of the particular batch of zinc phosphate being coated. Different batches of substrate will have slightly different surface areas and the duration of the reaction may be varied slightly for optimum results.

Note (iv) A short reaction time or a low temperature tends to give a product with a more pronounced bluish colour tinge and low covering power. A long reaction time or too high a reaction temperature tends to give a product of high covering power and low lustre with a gold or greenish colour tinge.

EXAMPLE 9

Example 8 was repeated using 90 g of zinc sulphate, 300 g of sodium thiosulphate, 80 g of the zinc orthophosphate paste [wetted with a 0.1 percent Manoxol OT solution (31 percent solids)] and 700 ml of distilled water, i.e., no additional surface-active agent was added. The product obtained was similar in appearance to that obtained in Example 8 but it dispersed less completely in the lacquer.

EXAMPLE 10

Example 8 was again repeated using 90 g of zinc sulphate, 300 g of sodium thiosulphate, 80 g of zinc orthophosphate paste [wetted with a 0.1 percent Manoxol O.T. solution (31 percent solids)] suspended in 160 ml of 0.1 percent Nansa HS solution and 700 ml of distilled water. The product was substantially identical to that obtained in Example 8.

EXAMPLE 11

Proceeding as described in Example 5 but replacing the aqueous Manoxol O.T. solution used to suspend the pearly zinc orthophosphate by water (50 ml), a product was obtained in the form of an ethanolic paste which exhibited a pearly effect when incorporated into a cellulose nitrate lacquer film. The suspension of the zinc orthophosphate in water producted aggregation of the particles but no adverse effects could be observed when the ethanolic paste of the product was incorporated in the cellulose nitrate lacquer film.

EXAMPLE 12

The procedure of Example 2 was repeated using 0.5 g "Nansa HS" flake in both of solutions A and B in place of the Manoxol O.T. Also the product was washed thoroughly with 0.05 percent w/v Nansa HS solution instead of with the 0.15 percent w/v Manoxol O.T. solution.

The product was generally similar to that obtained in Example 2 but was somewhat less pearly.

I claim:

1. A process for increasing the refractive index of substantially planar particles of a zinc orthophosphate of formula: $Zn_3(PO_4)_2 \cdot xH_2O$ in which $x$ has a value from 0 to 8 which comprises depositing thereon zinc sulphide formed in situ by heating an aqueous solution of a water-soluble zinc salt and a water-soluble thiosulphate at a temperature of at least about 65° C and at a pH above about 3.

2. A process according to claim 1 in which the concentration of planar particles in the solution is from 2 to 100 grams per litre.

3. A process according to claim 1 in which the deposition is carried out in the presence of an anionic surface-active agent.

4. A process according to claim 1 in which the deposition is carried out in the presence of sodium bis(2-ethylhexyl)sulphosuccinate or sodium dodecyl benzene sulphonate.

5. A process according to claim 1 in which the zinc salt is zinc sulphate, chloride, nitrate, acetate or formate.

6. A process according to claim 1 in which the thiosulphate is sodium thiosulphate.

7. A process according to claim 1 in which the deposition is carried out at a temperature of 65° to 78° C.

8. A process according to claim 1 in which the deposition is carried out at a pH from 4.2 to 4.5.

9. A process according to claim 1 in which the molar ratio of thiosulphate to zinc salt is from 6:1 to 2:1.

10. A process according to claim 1 in which the deposition is carried out without the addition of acid.

11. A process according to claim 1 in which an inert gas is bubbled through the solution during the deposition.

12. A process according to claim 1 in which the planar particles are 5 to 75 microns across.

13. A process according to claim 12 in which the planar particles are 10 to 40 microns across.

14. A process according to claim 1 in which the planar particles are 30 to 750 millimicrons thick.

15. A process according to claim 1 in which the length/thickness ratio of the planar particles is from 6:1 to 2,500:1.

16. A process according to claim 15 in which the length/thickness ratio of the planar particles is from 100:1 to 400:1.

17. A process according to claim 1 in which the zinc orthophosphate is obtained by mixing a solution of a zinc salt with a solution of a water-soluble phosphate, at a temperature from 85° to 97° C and then raising the temperature to boiling point and then cooling the mixture.

18. A process according to claim 17 in which zinc sulphate and disodium hydrogen phosphate are used.

19. A process according to claim 17 in which the pH of the solution is 2 to 4.

20. A process according to claim 17 in which the solution of a zinc salt is mixed with a solution of a water-soluble phosphate in the presence of an anionic surface-active agent.

21. A process according to claim 1 in which the product is subsequently heated in the presence of oxygen to at least 600° C.

22. A process according to claim 1 in which the product is subsequently heated to a temperature of at least 750° C.

23. A nacreous pigment whenever treated by a process as defined in claim 1.

24. A process according to claim 20 in which the wet zinc orthophosphate is used directly in the deposition process.

25. A process according to claim 1 in which $x$ is 4.

* * * * *